Nov. 5, 1968 K. J. SHAVER 3,409,392
METHOD FOR PREPARING ALKALI METAL TRIPOLYPHOSPHATE
PRECURSOR MIXTURE
Filed May 6, 1964
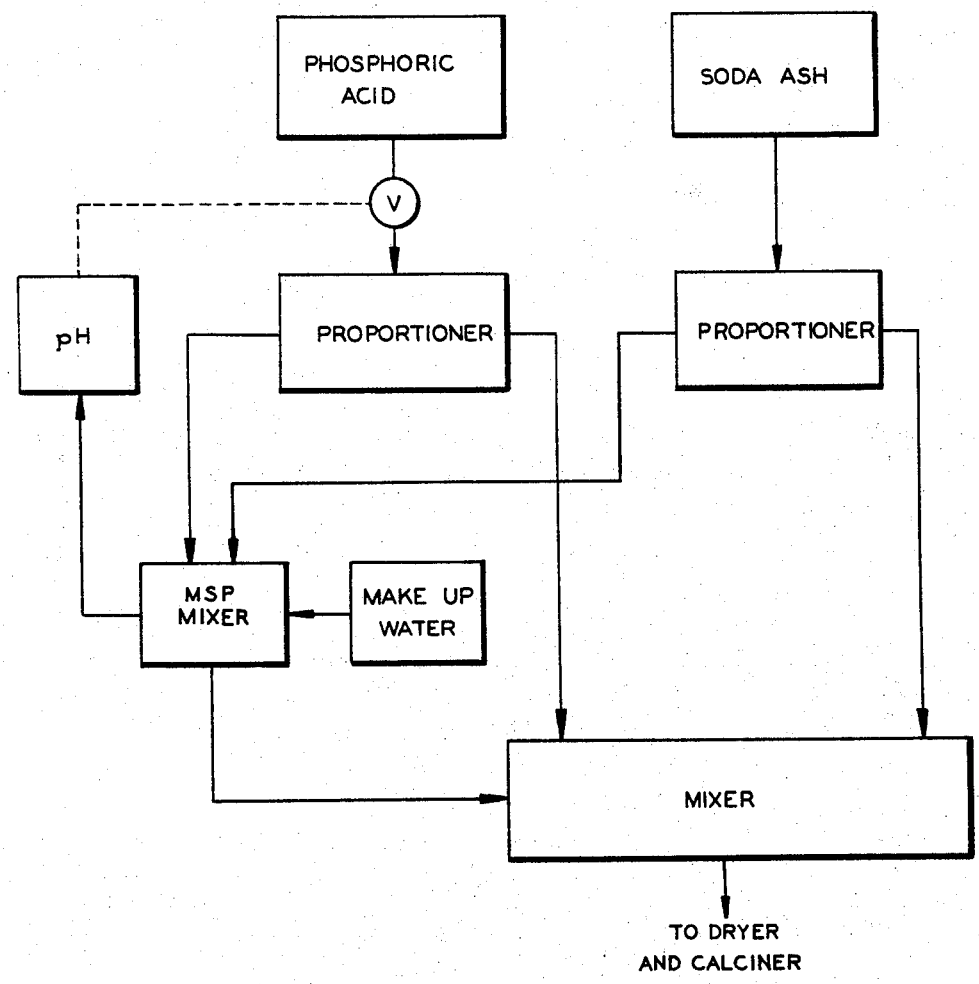
INVENTOR
KENNETH J. SHAVER
BY Richard H. Childress
ATTORNEY

United States Patent Office 3,409,392
Patented Nov. 5, 1968

3,409,392
METHOD FOR PREPARING ALKALI METAL TRI-POLYPHOSPHATE PRECURSOR MIXTURE
Kenneth J. Shaver, St. Louis, Mo., assignor to Monsanto Company, St. Louis, Mo., a corporation of Delaware
Filed May 6, 1964, Ser. No. 365,441
9 Claims. (Cl. 23—106)

ABSTRACT OF THE DISCLOSURE

In the continuous method wherein a phosphate source and an alkali metal source are used as reactants to form a precursor mixture having a molar ratio of di-alkali metal phosphate to mono-alkali metal phosphate of about 2:1 in slurry or dry particulate form suitable for use in further processing the precursor mixture into alkali metal tripolyphosphate, the improvement comprising continuously proportioning both of the reactants into two predetermined fractions and mixing one fraction from each reactant together with sufficient water to form a solution, correlating the flow of at least one of the reactants being proportioned to a property of the solution, and mixing the solution with the remaining fractions to form the precursor mixture.

---

This invention relates to the production of alkali metal tripolyphosphate and, more particularly, to an improved method for preparing an alkali metal phosphate precursor mixture which is suitable for further processing into an alkali metal tripolyphosphate, such as, sodium tripolyphosphate.

Although a large number of starting materials can be employed in preparing sodium tripolyphosphate, the starting material which has been used the most, both in the laboratory and in manufacturing procedures, has been a sodium phosphate precursor mixture having a molar ratio of disodium orthophosphate to monosodium orthophosphate of about 2:1. The molar ratio can be varied slightly and most manufacturers employ a slight excess of sodium ($Na_2O$) in their product to prevent the formation of turbidity in aqueous solutions of sodium tripolyphosphate due to small amounts of Maddrells' salts (Form II and III of $NaPO_3$) which are sometimes present as side-reaction products in sodium tripolyphosphate. Because there is no single physical measurement by means of which is possible to determine the precise end point of a single stage neutralization to produce the desired precursor mixture, the usual method of determination in commercial processes which are continuous is by chemical analysis of a sample which although comparatively simple is slow and cannot therefore be adapted easily to provide a continuous control.

In order to reduce the evaporative load in further processing steps it is oftentimes desirable to prepare the precursor mixture in slurry or dry particulate form. This has, heretofore, complicated the problem of process control since it is extremely difficult to obtain a sample which can be considered representative of the slurry or the substantially dry particles. In addition, it is important that the precursor mixture be correctly proportioned because of the many possible side products, such as pyrophosphates and metaphosphates, which are possible in the preparation of sodium tripolyphosphate. As can be appreciated, therefore, a method for preparing an alkali metal phosphate precursor mixture, that is, a mixture having a molar ratio of disodium orthophosphate to monosodium orthophosphate of about 2:1, in slurry or substantially dry particulate form and in correct proportion by an easy, economical and simply controlled procedure would represent an advancement in the art.

Therefore, an object of the present invention is to provide an improved continuous process for preparing an alkali metal phosphate precursor mixture in slurry or substantially dry particulate form suitable for further processing into alkali metal tripolyphosphate.

Another object of the present invention is to provide a continuous process for preparing an alkali metal phosphate precursor mixture in slurry or substantially dry particulate form suitable for further processing into alkali metal tripolyphosphate which can be carried out under highly accurate control means.

A further object of the present invention is to provide a continuous process for preparing an alkali metal phosphate precursor mixture in slurry or substantially dry particulate form suitable for further processing into alkali metal tripolyphosphate which can be controlled by a single control step.

A still further object of the present invention is to provide in a continuous process for preparing an alkali metal phosphate precursor mixture in slurry or substantially dry particulate form suitable for further processing into alkali metal tripolyphosphate a continuous control procedure for forming the precursor mixture with a desired composition in a highly accurate manner.

These, as well as other objects of this invention, are accomplished by a process using phosphate sources and alkali metal sources as reactants which comprises continuously proportioning both reactants into two predetermined fractions and reacting together one fraction from each reactant to form a solution under control conditions such that the solution when mixed with the remaining fractions form the precursor mixture with a desired composition, all of which will be more fully discussed hereinafter.

The present invention takes advantage of the control procedure afforded by the use of a relatively small quantity of solution which provides a continuous monitoring of the composition of the precursor mixture. Control by use of a solution is particularly advantageous for the continuous process because it enables a more effective control than that afforded by sampling a slurry or dry particulate mixture. Although there are many variables in the present invention which include the use of various split ratios of reactants, variations in process rates and the like, it can be appreciated that in preparing a substantially dry precursor mixture, the phosphate source and/or the alkali metal source should preferably contain as little free water as possible as well as using portions which are as small as possible to form the solution, thereby restricting the amount of water which is added to the system. In such cases it is usually necessary to add make up water to ensure that the reactants are in solution. The use of slurries or substantially dry particulate precursor mixtures, of course, enable an important process economy by reducing further processing steps to remove the free water and/or reducing the evaporative load in the calciner. It is possible, however, to use a relatively dilute phosphate source and/or alkali metal source in order that the portions thereof can directly form the solution and thereby dispense with the need for make up water. However, this procedure results in a slurry containing an appreciable amount of water.

In general, any phosphate source can be used as long as it is capable of reacting with the alkali metal source to form the desired alkali metal phosphate precursor mixture. In particular, phosphate sources which are suitable are those which contain the phosphate anion and which include orthophosphoric acid, alkali metal orthophosphate salts, alkali metal pyrophosphate salts, condensed phosphoric acid, i.e., an acid containing polymers of orthophosphoric acid, phosphorus pentoxide as well as alkali metal phosphate streams, i.e., solutions or slurries, which have known compositions and which have an alkali metal to phosphorus molar ratio different than the alkali metal phosphate salts such as hemi-alkali metal phosphate streams and the like. The ortho- and condensed phosphoric acids suitable for use are preferably concentrated, i.e., containing less than about 50% water by weight, with orthophosphoric acid containing from about 10 to 30% water by weight being especially preferred.

In general, any alkali metal source is suitable as long as it is capable of reacting with the phosphate source to form the desired alkali metal phosphate precursor mixture. It is preferred that the alkali metal source used be such as to provide only the alkali metal oxide in the desired proportion with the phosphorus pentoxide in the final tripolyphosphate product. In particular, such alkali metal sources which contain moieties capable of producing or forming gases during the reaction or being volatilized away during further processing steps in preparing the phosphate compositions are preferred. Such alkali metal sources include the basic inorganic salts, oxides and hydroxides, such as $Na_2CO_3$, NaOH, $Na_2O$, $K_2CO_3$, KOH, $K_2O$, KCl, $Li_2CO_3$, and the like. Although the alkali metal sources of cesium and rubidium can, in some cases, be used in practicing this invention, since they are relatively extensive and are not readily available they are not the preferred materials for use as the alkali metal sources. In addition, other alkali metal sources which can be used include those materials which contain organic radicals such as oxalates, citrates, and the like, such as sodium oxalate, sodium citrate, and the like. Because the sodium and potassium tripolyphosphate compositions are, in general, the most widely used tripolyphosphate compositions and because such alkali metal sources as $Na_2CO_3$, NaOH, $K_2CO_3$, and KOH are relatively inexpensive as well as being readily available, they are preferred alkali metal sources for use in practicing the invention.

Because of the wide variations of phosphate sources and alkali metal sources which can be used in the process of the present invention as well as variations in such process conditions as the type of reactants proportioned and method for controlling the formation of the solution, any solution can be formed having, in general, any molar ratio of alkali metal to phosphorus although it is preferred, because of the ease of controlling the solution, that either a solution having a molar ratio of alkali metal to phosphorus of about 1:1 or about 2:1 (hereinafter termed mono-alkali metal phosphate solution and di-alkali metal phosphate solution, respectively) be formed under accurately controlled procedures.

Accurate control of the solution which is formed under controlled procedures can be carried out by such means as colorimetry, turbidimetry, nephelometry, conductance, viscosity, specific gravity measurements, pH measurements and the like. Measurements of pH, especially electrometric pH determination, are preferred because the pH of a mono-alkali metal phosphate or di-alkali metal phosphate solution is extremely sensitive to small changes in the alkali metal to phosphorus molar ratio and therefore such can be used to accurately determine the end point. Substantially dilute solutions, that is, from about 0.5% to about 25% concentration, are preferred because the more dilute solutions exhibit more sensitive pH changes and concentrations from about 1% to about 10% concentrations are especially preferred. For example, a 1% solution at 25° C. having a sodium to phosphorus molar ratio of 0.99:1 has a pH of about 4.0 while a solution having a molar ratio of 1.01:1 has a pH of about 4.9.

Because the solution which is used to correlate with and thereby control the composition of the precursor mixture by means of a substantially continuous monitor thereof is also used in the formation of the composition of the precursor mixture, it is preferred that the quantity of solution be kept as small as possible especially when preparing a substantially dry particulate mixture. It is therefore preferred that the portions of reactants which are used to form the solution be from about 0.5% to about 20% of the total reactants by weight, with from about 1% to about 10% being especially preferred.

Suitable mechanical means for accurately proportioning the phosphate source and the alkali metal source into two predetermined fractions includes such arrangements as disclosed in the co-pending application of Robert B. Hudson Serial No. 365,365 entitled, Apparatus and Method for Proportioning a Material, filed this same date and now U.S. Patent 3,249,116.

The alkali metal phosphate precursor mixture of the present invention, that is, a mixture in slurry or substantially dry particulate form and having a molar ratio of di-alkyl metal orthophosphate to mono-alkali metal orthophosphate of about 2:1, can be further processed into alkali metal tripolyphosphate by various methods known in the art, such as, forming an intimate mixture of the mono-alkali metal and di-alkali metal phosphate suitable for calcining by means which include drum drying or spray drying the slurry and ball-milling or comminution of a mixture of the solids; followed by the calcination of such mixture at temperatures from above about 260° C. but below the melting point of the desired tripolyphosphate. It should also be noted that a melt of the precursor mixture can be formed, rapidly chilled to a glass and subsequently tempered to form the desired alkali metal tripolyphosphate.

Reference will now be made to the accompanying drawing which illustrates diagrammatically the operation of the various stages of the continuous process according to one of the preferred forms of the invention in proportioning the sodium source (soda ash) and phosphate source (phosphoric acid) in the preparation of a sodium phosphate precursor mixture suitable for further processing into sodium tripolyphosphate, In carrying the invention into effect according to a preferred embodiment thereof as indicated in the drawing, the process is established on the basis of continuous production of about 10,000 lbs./hr. of sodium tripolyphosphate precursor mixture using ⅔ gallon per minute make up water, the soda ash being proportioned into a weight ratio of 8:92 and the orthophosphoric acid (85% concentrated by weight) being proportioned into a weight ratio of 13:87. About 7,200 lbs./hr. of soda ash is passed into a suitable proportioner where it is accurately divided into a weight ratio of about 8:92 and about 9,400 lbs./hr. of phosphoric acid is passed into another suitable proportioner where it is accurately divided into a weight ratio of about 13:87. The 8 parts of soda ash (about 562 lbs./hr.) and 13 parts of phosphoric acid (about 1224 lbs./hr.) are mixed in a suitable vessel (MSP MIXER), preferably under agitation, to form a monosodium orthophosphate solution. About 334 lbs./hr. of make up water is added to the MSP MIXER in order that a monosodium orthophosphate solution of about 60% by weight is prepared. The flow rate of the phosphoric acid passed to the proportioner is correlated to an electrometric pH measurement of the monosodium orthophosphate solution and is thereby controlled by achieving the desired degree of neutralization in forming the monosodium orthophospate solution, thus enabling a precursor mixture to be formed with a desired composition. The pH measurement is preferably made on a diluted (about 1% concentration) and cooled sample of the MSP MIXER contents and, depending upon measurement conditions, is usually about 4.5. Conventional arrangements for controlling the phosphoric acid include a pH meter coupled with a pneumatically operated system or electrically operated system for actuating the valve located on the phosphoric acid feed line. This method of monitoring and controlling the MSP MIXER and thereby controlling the composition of the precursor mixture is particularly accurate and effective since the pH of a dilute solution of monosodium orthophosphate is very sensitive to small changes in the molar ratio of sodium to phosphorus. The carbon dioxide gases and water vapor evolved during the neutralization are preferably exhausted from the MSP MIXER. The monosodium orthophosphate solution is then passed to a suitable vessel (MIXER) at the rate of about 1274 lbs./hr. along with the 92 parts of soda ash (about 6,638 lbs./hr.) and the 87 parts of orthophosphoric acid (about 8,177 lbs./hr.) to form in the MIXER the precursor mixture slurry at the rate of about 11,000 lbs. of solids/hr. with a composition having a molar ratio of about 2 moles of disodium orthophosphate and 1 mole monosodium orthophosphate. The sodium tripolyphosphate precursor mixture can be further processed by conventional means into sodium tripolyphosphate as hereinbefore described.

It should be noted that in the above process the concentration of the monosodium phosphate solution in the MSP MIXER can vary since the orthophosphoric acid flow rate is controlled and thereby subject to variation while the make up water is added to the MSP MIXER at a substantially constant rate. However, the make up water flow rate can be correlated to the concentration of the monosodium phosphate solution by such means as specific gravity measurements and the like in order to maintain the solution at a relatively constant concentration, although it is usually not necessary to do so since the pH measurements are usually made on a relatively dilute solution and are not, therefore, materially affected by such changes in concentration.

The foregoing process can be modified in many and various ways as, for example, an orthophosphoric acid solution of about 66.7% concentration can be used under process conditions as hereinbefore described and thus the make up water need not be utilized, although the precursor mixture will contain more water than the foregoing described precursor mixture. In addition, an orthophosphoric acid of about 100% concentration can be used at a rate of about 8,000 lbs./hr. and proportioned into a ratio of about 92:8, soda ash can be used at a rate of about 7,200 lbs./hr. and proportioned into a ratio of about 20:1, and make up water used for the monosodium phosphate solution at about 334 lbs./hr. in order to form a precursor mixture at about 11,000 lbs. solids/hr. Further, an orthophosphoric acid of about 70% concentration can be used at a rate of about 11,434 lbs./hr. and proportioned into a ratio of about 24:1, soda ash can be used at a rate of about 7,200 lbs./hr. and proportioned into a ratio of about 49:1, and make up water used for the monosodium phosphate solution at about 19 lbs./hr. in order to form a precursor mixture at about 11,000 lbs. solids/hr. In addition, the concentration of the monosodium phosphate solution can be varied as, for example, from about 1% to about 60% concentration, although for forming precursor mixtures which contain as little as water as possible it is preferred that the monosodium phosphate solution have a concentration of from about 40% to about 60%.

It should be noted that potassium tripolyphosphate can be prepared by potassium phosphate precursor mixtures prepared by substantially the same methods as utilized in the foregoing description when potassium sources are used as the alkali metal sources although the exact pH measurement used for control purposes will usually vary slightly from that of the sodium phosphates but such can be readily determined.

What is claimed is:

1. In the continuous method wherein a phosphate source and an alkali metal source are used as reactants to form a precursor mixture having a molar ratio of di-alkali metal phosphate to mono-alkali metal phosphate of about 2:1 in slurry or substantially dry particulate form suitable for use in further processing the precursor mixture into alkali metal tripolyphosphate, the improvement comprising continuously proportioning both of said reactants into two predetermined fractions and mixing one fraction from each reactant together with sufficient water to form a solution having a concentration of from about 0.5% to about 25% by weight, correlating the flow of at least one of said reactants being proportioned to a property of said solution, and mixing said solution with the remaining fractions to form said precursor mixture having a molar ratio of di-alkali metal phosphate to mono-alkali metal phosphate of about 2:1.

2. In the continuous method wherein a phosphate source and an alkali metal source are used as reactants to form a precursor mixture having a molar ratio of di-alkali metal phosphate to mono-alkali metal phosphate of about 2:1 in slurry or substantially dry particulate form suitable for use in further processing the precursor mixture into alkali metal tripolyphosphate, the improvement comprising continuously proportioning both of said reactants into two predetermined fractions, mixing one fraction from each reactant together with sufficient water to form a solution monitored by electrometric pH measurements, said solution having a composition selected from the class consisting of mono-alkali metal phosphate and di-alkali metal phosphate having a concentration of from about 0.5% to about 25% by weight, correlating the flow of one of said reactants being proportioned to said pH measurements of said solution, and mixing said solution with the remaining fractions to form said precursor mixture having a molar ratio of di-alkali metal phosphate to mono-alkali metal phosphate of about 2:1.

3. The method of claim 2, wherein the alkali metal tripolyphosphate is sodium tripolyphosphate and the alkali metal source is a sodium source.

4. The method of claim 2, wherein the alkali metal tripolyphosphate is potassium tripolyphosphate and the alkali metal source is a potassium source.

5. In the continuous method wherein a phosphate source and an alkali metal source are used as reactants to form a precursor mixture having a molar ratio of di-alkali metal phosphate to mono-alkali metal phosphate of about 2:1 in slurry or substantially dry particulate form suitable for use in further processing the precursor mixture into alkali metal tripolyphosphate, the improvement comprising continuously proportioning both of said reactants into two predetermined fractions, one fraction of each being from about 0.5 to 20 weight percent of the total reactant, mixing said one fraction from each reactant together with sufficient water to form a solution monitored by electrometric pH measurements, said solution composition having the composition selected from the class consisting of mono-alkali metal phosphate and di-alkali metal phosphate, correlating the flow of one of said reactants being proportioned to said pH measurements of said solution, and mixing said solution with the remaining fractions to form said precursor mixture.

6. The method of claim 5, wherein the alkali metal tripolyphosphate is sodium tripolyphosphate and the alkali metal source is a sodium source.

7. The method of claim 5, wherein the alkali metal tripolyphosphate is potassium tripolyphosphate and the alkali metal source is a potassium source.

8. In the continuous method wherein phosphoric acid and sodium carbonate are used as reactants to form a precursor mixture having a molar ratio of disodium phosphate to monosodium phosphate of about 2:1 in slurry or substantially dry particulate form suitable for use in further processing the precursor mixture into sodium tripolyphosphate, the improvement comprising continuously proportioning both of said reactants into two predetermined fractions, one fraction of each being from about 1 to 10 weight percent of the total reactant, mixing said one fraction from each reactant together with sufficient water to form a monosodium phosphate solution monitored by electrometric pH measurements, correlating the flow of said acid being proportioned to said pH measurements of said solution, and mixing said monosodium phosphate solution with the remaining fraction to form said precursor mixture.

9. The method of claim 8, wherein said orthophosphoric acid has a concentration of from about 70 to 90 weight percent and said monosodium phosphate solution has a concentration from about 40 to about 60 weight percent.

References Cited

UNITED STATES PATENTS 2,772,779 1/1952 Norris _____ 210—29
3,180,699 9/1960 Ballestra _____ 23—1

OSCAR R. VERTIZ, *Primary Examiner.*

L. A. MARSH, *Assistant Examiner.*